(12) United States Patent
Stalley

(10) Patent No.: US 8,332,300 B2
(45) Date of Patent: *Dec. 11, 2012

(54) COMPUTER-BASED SYSTEM

(75) Inventor: Michael Stalley, Farnham (GB)

(73) Assignee: Fiscal Reps Limited, UK, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 13/407,923

(22) Filed: Feb. 29, 2012

(65) Prior Publication Data

US 2012/0158559 A1 Jun. 21, 2012

Related U.S. Application Data

(63) Continuation of application No. 12/188,249, filed on Aug. 8, 2008, now Pat. No. 8,175,948.

(30) Foreign Application Priority Data

Jun. 9, 2008 (IE) .................................. S2008/0474

(51) Int. Cl.
*G06Q 40/00* (2006.01)
(52) U.S. Cl. .......................................... 705/36; 705/35
(58) Field of Classification Search ........... 705/7, 35–40
See application file for complete search history.

(56) References Cited

U.S. PATENT DOCUMENTS 8,175,948 B2 5/2012 Stalley
2008/0177601 A1* 7/2008 Strnad et al. ...................... 705/7

OTHER PUBLICATIONS

Petrimouix et al., United States Statutory Invention Registration No. H1,830, published Jan. 4, 2000.

* cited by examiner

*Primary Examiner* — Thu Thao Havan
(74) *Attorney, Agent, or Firm* — Garder, Linn, Burkhart & Flory, LLP

(57) ABSTRACT

A computer-based system for determining insurance premium taxes (IPT) for multiple clients in a plurality of jurisdictions comprises an electronic database containing data identifying a plurality of classes of risk in each tax jurisdiction for which IPT is payable, the tax rates for each tax type applicable to each class of risk in each jurisdiction, the tax-collection organization(s) in each jurisdiction for each class of risk, and financial data supplied by clients. Software associated with the database receives financial data from each client relating to insurance transactions for which IPT is payable and stores said data in the database, determines from said financial data the relevant class(es) of risk for each jurisdiction and the tax payable in respect thereof to each tax-collection organization in the jurisdiction, and prepares a tax return for each transaction for which IPT is due.

16 Claims, 3 Drawing Sheets

COMPUTER-BASED SYSTEM

CROSS-REFERENCE TO RELATED APPLICATIONS

This application is a continuation of U.S. patent application Ser. No. 12/188,249, filed Aug. 8, 2008, now U.S. Pat. No. 8,175,948, which claims priority of Irish patent application, Ser. No. S2008/0474, filed on Jun. 9, 2008, now Irish Pat. No. S85018, the disclosures of which are hereby incorporated herein by reference in their entireties.

FIELD OF THE INVENTION

This invention relates to a computer-based system for determining insurance premium taxes for multiple clients in a multi-national environment.

BACKGROUND TO THE INVENTION

Insurance Premium Tax (IPT), which for the purposes of the present specification includes parafiscal taxes, is a government tax payable on insurance premiums. For any given country the rate(s) of tax may vary, and be payable to, different tax-collecting organisations, according to the type of tax. Clearly, where an insurer collects multiple premiums in a large number of countries, the job of determining and paying the correct tax in each country is considerable.

It is an object of the invention to provide a computer-based system for alleviating the work involved in such transactions.

SUMMARY OF THE INVENTION

The invention provides a computer-based system for determining insurance premium taxes (IPT) for multiple clients in a plurality of countries, the system comprising an electronic database containing data identifying:
   (a) a plurality of classes of risk in each country for which IPT is payable,
   (b) the tax rates for each tax type applicable to each class of risk in each country,
   (c) the tax-collection organisation(s) in each country for each class of risk,
   (d) financial data supplied by clients,
   the system further including software associated with the database for receiving financial data from each client relating to insurance transactions for which IPT is payable and storing said data in the database, determining from said financial data the relevant class(es) of risk for each country and the tax payable in respect thereof to each tax-collection organisation in the country, and preparing a tax return for each transaction for which IPT is due.

In an embodiment the software is further arranged to prepare a message for sending to clients requesting said financial data at a predetermined time before the relevant tax is due.

Preferably clients are able to access the database remotely via the software in order to supply said financial data, most preferably via an internet website established by the software.

In such a case the software can establish different levels of access for different client personnel.

BRIEF DESCRIPTION OF THE DRAWINGS

An embodiment of the invention will now be described, by way of example, with reference to the accompanying drawings, in which.

DESCRIPTION OF AN EMBODIMENT OF THE INVENTION

Figure 1:
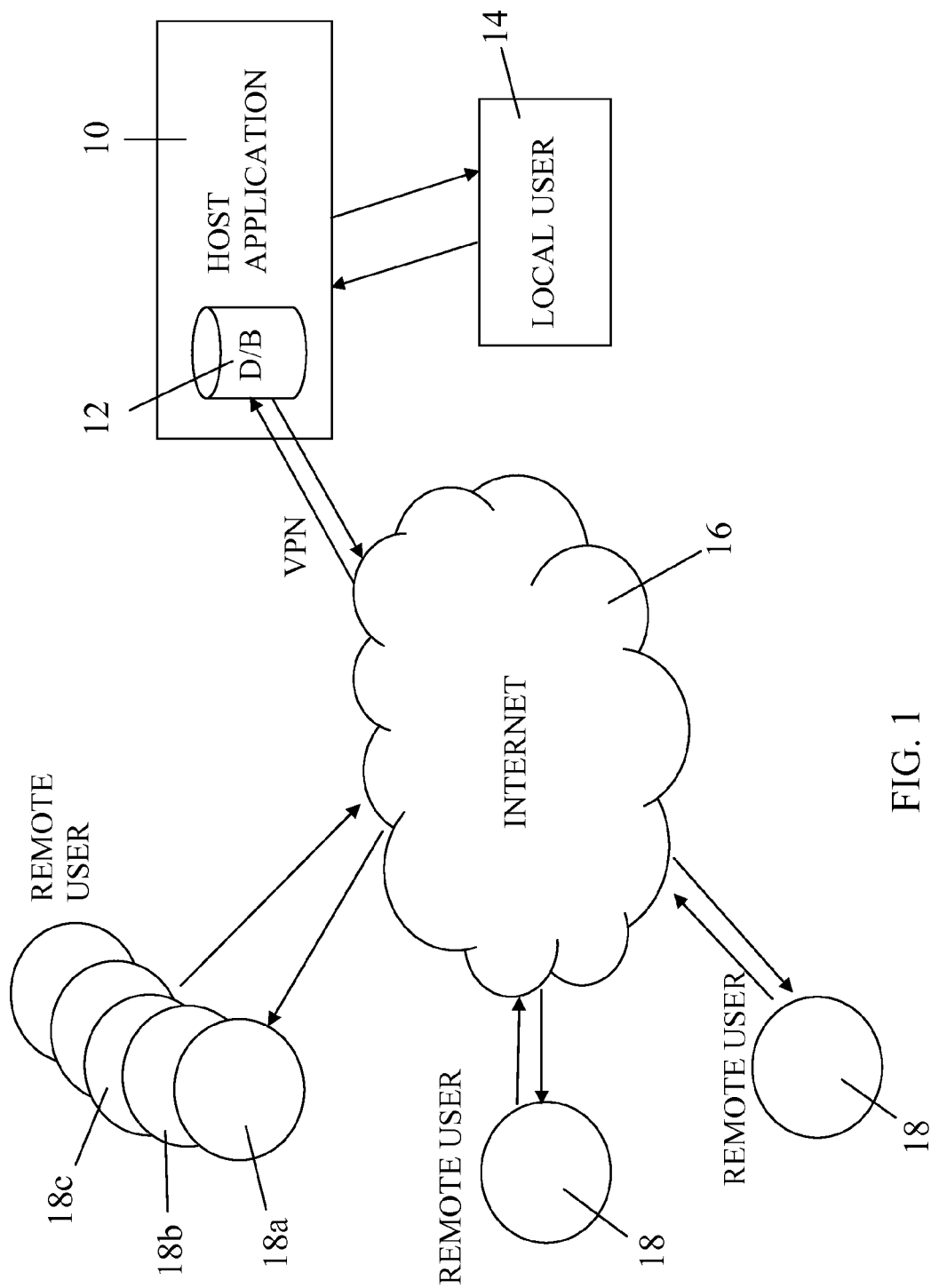
FIG. 1 is a schematic diagram of a computer-based data processing system for performing the invention.

Referring to FIG. 1, a computer-based data processing system for determining insurance premium taxes for multiple clients in a plurality of countries comprises a central host including a software application 10 and a database 12 accessible through the application 10. The database 12 is directly accessible by one or more local users 14, and indirectly accessible via the internet 16 by one or more remote users 18.

The remote users 18 will typically be business clients of the organisation maintaining the central host, who will be acting as an agent of the clients in respect of filing their tax returns and paying the taxes due. The remote users 18 interact with the application 10 and database 12 by logging on to the agent's website which is established by the application. Each remote user 18 may include multiple persons 18A, 18B, etc., authorised to access the database 12, and these may have different levels of authority (i.e. different levels of database access) validated by password or other means at the website. Likewise, local users (agency personnel) 14 may also be limited by password to different levels of access to the database 12. Access to the host application 10 and database is via a virtual private network or other access control method.

Although the remote users 18 will generally be business clients of the agent having access only to their own data on the database 12, the system provides for certain remote users 18 to have access to a number of clients' data on the database. These will typically be independent agents who are renting space on the database, and the data they have access to will be that of their own clients. Such remote users may have the full or partial functionality of the software 10 at their disposal, as determined by their level of access authority, but only for processing their own clients' data.

Figure 2:
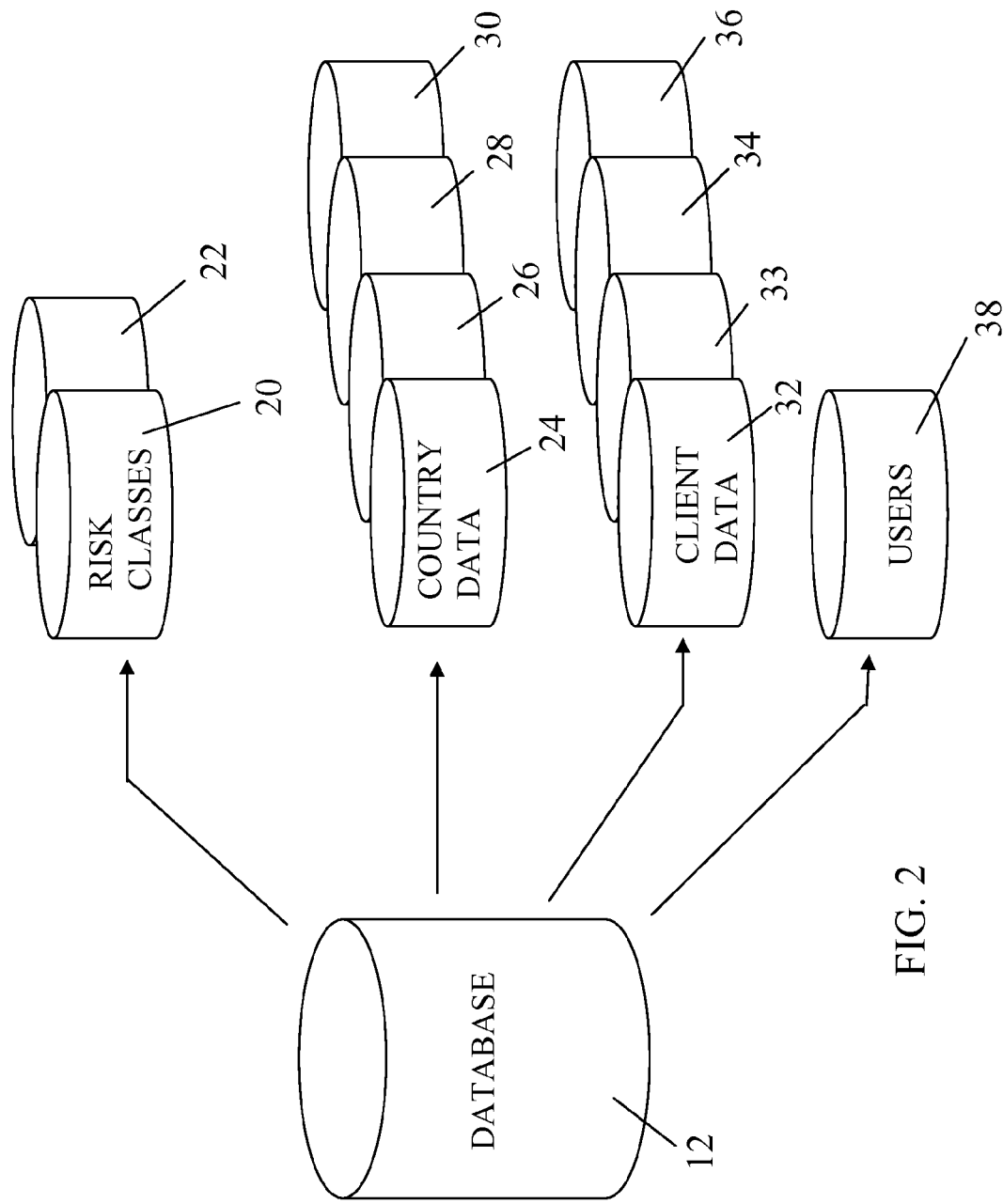
FIG. 2 is a schematic diagram of a digital electronic database forming part of the system of FIG. 1.

Turning to FIG. 2, the database 12 includes the following data:

The various business classes (classes of risk) 20 for which IPT is payable in the countries covered by the system, including any sub-classes 22. These will include the following eighteen EU designated non-life classes, as well as any classes specific to any other forms of insurance business (including but not limited to life, non-life, direct and reinsurance) in any particular country:

1. Accident (including industrial injury and occupational diseases).
2. Sickness.
3. Land vehicles (other than railway rolling stock).
4. Railway rolling stock.
5. Aircraft.
6. Ships (sea, lake, river and canal vessels).
7. Goods in transit (including merchandise, baggage and all other goods).
8. Fire and natural forces.
9. Other damage to property.
10. Motor vehicle liability.
11. Aircraft liability.
12. Liability for ships (sea, lake, river and canal vessels)
13. General liability.
14. Credit.
15. Suretyship.
16. Miscellaneous financial loss.

17. Legal expenses.
18. Assistance.

Data 24 specific to each country, including the tax rates 26 for each tax type applicable to each class of risk in the country, softcopy templates 28 of the standard forms and tax returns used in the country, and an identification 30 of the tax-collection organisation(s) ("tax offices") in the country for each class of risk.

Data 32 specific to each client, including client class of risk mappings to EU standard 33, IPT returns 34 (i.e. raw financial data supplied via the internet by the client in, e.g. xls or csv format), and records 36 of tax returns filed on behalf of the client per country per date.

User permissions 38. These identify the level of database access allowed for the personnel 18A, 18B, etc., of each remote client 18. According to the level of access, the particular person currently logged on may be limited to viewing and/or downloading the data in certain parts of the database relevant to that client, for example to request reports, summaries of activities, etc., or may (if the level of access is sufficiently high) additionally be able to edit such data.

In addition, and not shown in FIG. 2, the database 12 contains financial questionnaires for completion via the internet by potential clients, and standard contracts which can be edited by local users 14 and printed off for signing by the agent and client.

Figure 3:
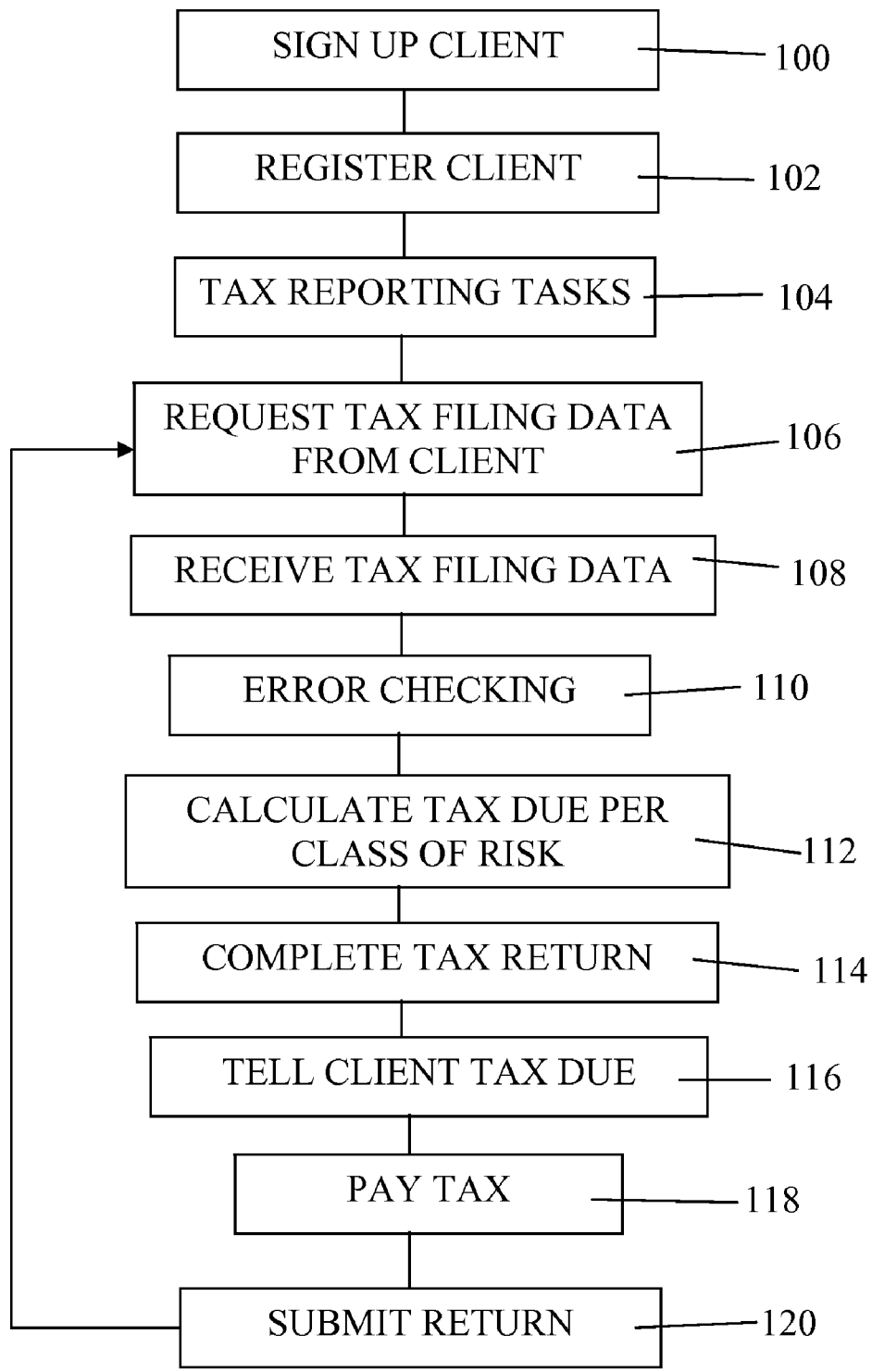
FIG. 3 shows the workflow of the system in operation.

Referring now to FIG. 3, in use of the system potential clients 18 are acquired and signed up to the agent through conventional marketing activities, e.g. press or internet, step 100. Each client is asked to complete a questionnaire which is accessed via the agent's website and which details the client's financial affairs to the extent they are relevant to the client's potential liability to IPT. Then a contract is submitted to the client which, after possible amendment through negotiation, is printed off and signed by both parties. Copies of the completed questionnaire and contract are held in the client-specific data 32 on the database 12.

Next, step 102, the client is registered at the relevant tax offices in each country in which the client transacts insurance business. When the client is registered at a particular tax office he is given a unique tax ID for that office which is stored in the data 32 and communicated via email to the client. Registration may be done online if the relevant tax office supports online communication, or offline.

At step 104, upon prompting by a local user 14, the application 10 generates a list of tax reporting tasks for the newly registered client. This is a list of the different taxes potentially payable by that client in each country, according to the different classes of business undertaken by that client in each country, and the dates the relevant tax returns have to be made to the relevant tax offices. The tax reporting tasks are stored in the client data 32.

At step 106, for each client, at a predetermined time before any given tax return is due to be filed, the application software 10 prepares a message to be sent to the client requesting the relevant financial data (tax filing data) from which the calculation of the relevant tax can be made. After review by local users 14, the message is sent, e.g. as an email or SMS message.

When the tax filing data is received from the client, e.g. in xls or csv format, it is stored by the application 10 in the client data 32, step 108. The tax filing data is received over the internet, via the agent's website. If no data is received from the client by a certain cut-off date, a reminder is sent or a phone call is made to the client.

At step 110 the application 10 checks the tax filing data for errors, using criteria stored on the database 12. If there are errors, this is flagged to a local user 14 who is able to intervene and manually edit the tax filing data.

Now, step 112, the application 10 calculates, from the stored tax filing data returned by that client, the tax due from the client per class of risk and, step 114, completes a tax return.

At step 116 the amount of tax due is communicated to the client by email or SMS, and the relevant sum of money requested from the client for payment to the tax office by the agent.

Step 118, when payment has been received from the client, the tax is paid on behalf of the client to the tax office. This may be done on- or off-line.

The completed and checked tax return is now submitted to the relevant tax office, step 120. This may be done online if the relevant tax office supports online communication, or the tax return may be printed off by the application 10 and sent by courier. If sent by courier, the package is tracked to ensure that it was delivered.

The sequence of steps 106-120 is repeated for each client each time a tax is due, or potentially due, as determined by the tax reporting tasks generated at step 104. Although not shown, the system also provides for de-registration of clients at the relevant tax office(s) if those clients should no longer transact insurance business of the relevant kind(s).

It will be understood that for each country the list of tax reporting tasks generated at step 104 and the calculation of the tax due at step 112 is based upon a particular "interpretation" of the tax law as it applies to the classes of risks in the country concerned. This interpretation will be based, for example, upon case law in the country. There is often a legitimate difference of opinion between tax professionals as to the particular tax that applies in any particular case, and therefore the interpretation used by the system can be modified or updated as necessary or desired. Naturally the system can also be updated to reflect any updates on tax rates or tax types promulgated by the tax authorities.

Although the foregoing has described an embodiment in which communication between clients and agent is via the internet, other arrangements are possible. For example, the clients and agent could communicate via wired or wireless network, or the invention could be implemented as a standalone local machine.

The invention is not limited to the embodiments described herein which may be modified or varied without departing from the scope of the invention.

The invention claimed is:

1. A computer-based system for determining insurance premium taxes (IPT) for multiple clients in a plurality of tax jurisdictions, the system comprising an electronic database containing data identifying:
   (a) a plurality of classes of risk in each jurisdiction for which IPT is payable,
   (b) the tax rates for each tax type applicable to each class of risk in each jurisdiction,
   (c) the tax-collection organisation(s) in each jurisdiction for each class of risk,
   (d) financial data supplied by clients,
   the system further including software operatively associated with a processor and the database for receiving financial data from each client relating to insurance transactions for which IPT is payable and storing said data in the database, determining from said financial data the relevant class(es) of risk for each jurisdiction and the tax payable in respect thereof to each tax-collection organisation in the jurisdiction, and preparing a tax return for each transaction for which IPT is due.

2. A system as claimed in claim 1, the software further being arranged to prepare a message for sending to clients requesting said financial data at a predetermined time before the relevant tax is due.

3. A system as claimed in claim 1, wherein clients are able to access the database remotely via the software in order to supply said financial data.

4. A system as claimed in claim 3, wherein clients access the database via an internet website established by the software.

5. A system as claimed in claim 4, wherein the software can establish different levels of access for different client personnel.

6. A system as claimed in claim 2, wherein clients are able to access the database remotely the software in order to supply said financial data.

7. A system as claimed in claim 6, wherein clients access the database via an internet website established by the software.

8. A system as claimed in claim 7, wherein the software can establish different levels of access for different client personal.

9. A computer-based system for determining insurance premium taxes (IPT) for multiple clients in a plurality of tax jurisdictions, the system comprising an electronic database containing data identifying:
 (a) a plurality of classes of risk in each jurisdiction for which IPT is payable,
 (b) the tax rates for each tax type applicable to each class of risk in each jurisdiction,
 (c) the tax-collection organisation(s) in each jurisdiction for each class of risk,
 (d) financial data supplied by clients,
 (e) soft copy templates of the standard forms and tax returns used in a jurisdiction, the system further including software operatively associated with a processor and the database for receiving financial data from each client relating to multiple insurance transactions for which IPT is payable and storing said data in the database; checking the financial data received from each client using criteria stored on the database, determining from said financial data the relevant class(es) of risk for each jurisdiction and the tax payable in respect thereof to each tax-collection organisation in the jurisdiction, registering each client at one of the tax-collection organizations, and obtaining a unique client tax ID for that organisation, and preparing a tax return for each transaction for which IPT is due, advising each client of amount of tax due, and making payment of the tax due.

10. A system as claimed in claim 9, the software further being arranged to prepare a message for sending to clients requesting said financial data at a predetermined time before the relevant tax is due.

11. A system as claimed in claim 9, wherein clients are able to access the database remotely via the software in order to supply said financial data.

12. A system as claimed in claim 11, wherein clients access the database via an internet website established by the software.

13. A system as claimed in claim 12, wherein the software can establish different levels of access for different client personnel.

14. A system as claimed in claim 10, wherein clients are able to access the database remotely the software in order to supply said financial data.

15. A system as claimed in claim 14, wherein clients access the database via an internet website established by the software.

16. A system as claimed in claim 15, wherein the software can establish different levels of access for different client personal.

\* \* \* \* \*